March 11, 1924.
R. R. MILLER
CONVERTER ATTACHMENT FOR DRIVE WHEELS OF AUTOMOTIVE VEHICLES
Filed Dec. 18, 1920  3 Sheets-Sheet 2
1,486,597
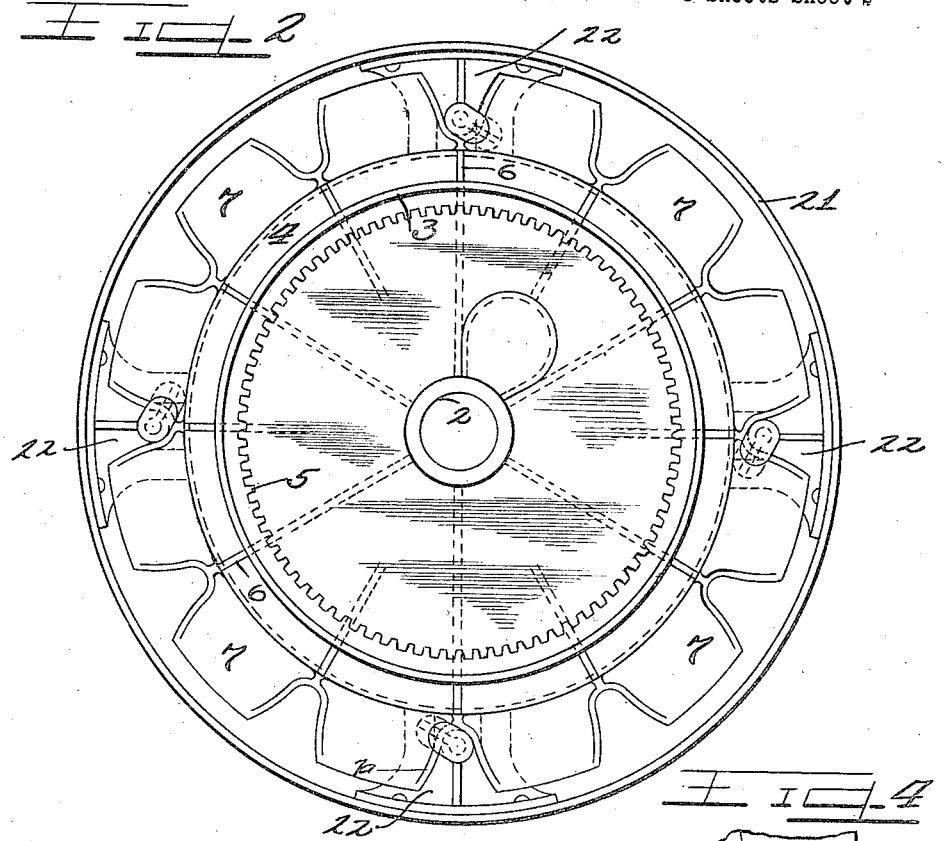
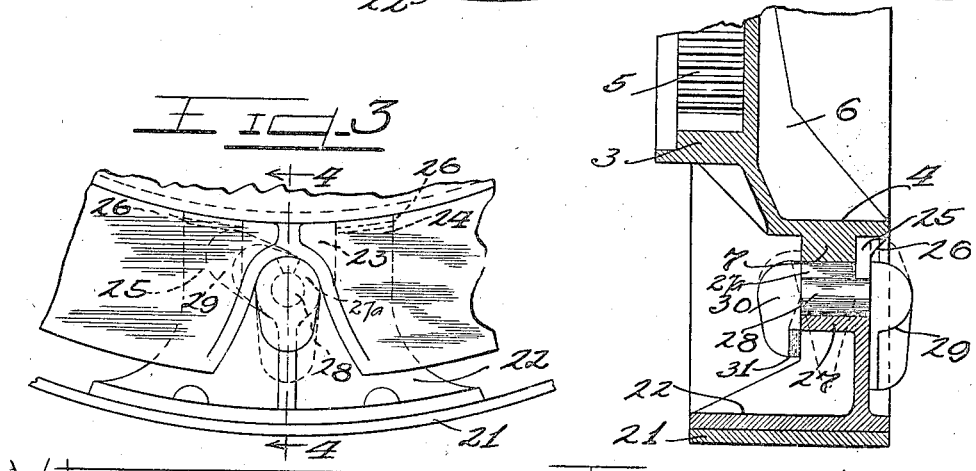

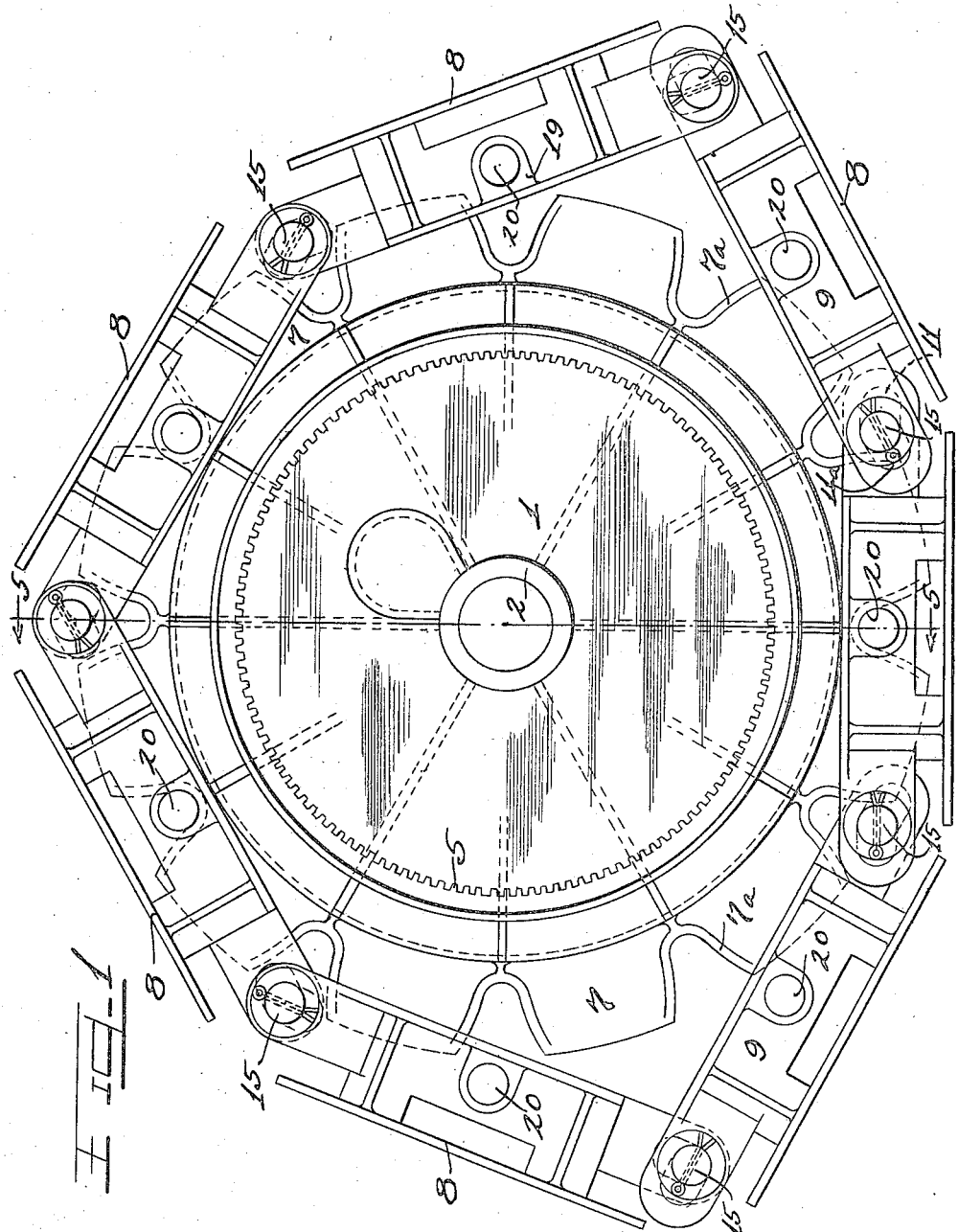

March 11, 1924.
R. R. MILLER
1,486,597
CONVERTER ATTACHMENT FOR DRIVE WHEELS OF AUTOMOTIVE VEHICLES
Filed Dec. 18, 1920    3 Sheets-Sheet 3
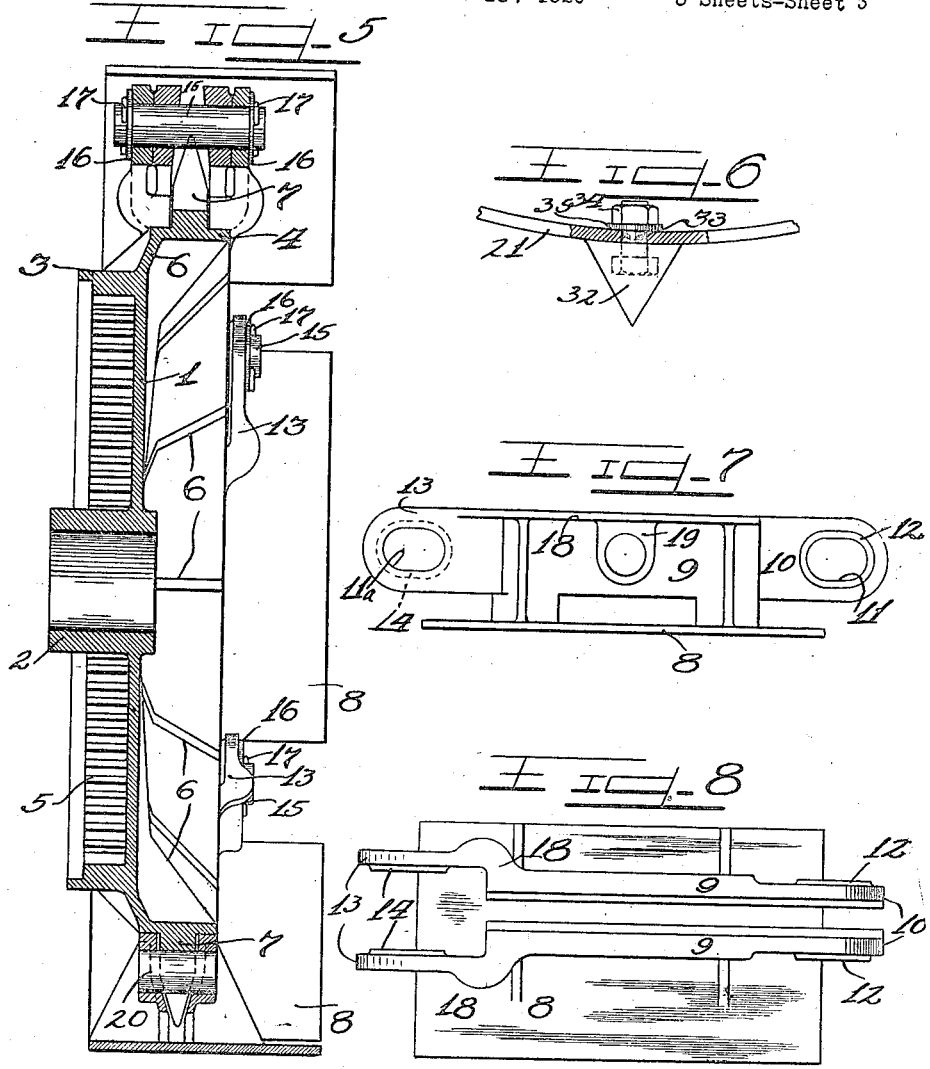

Patented Mar. 11, 1924

1,486,597

UNITED STATES PATENT OFFICE.

ROYAL R. MILLER, OF CHICAGO, ILLINOIS, ASSIGNOR, BY MESNE ASSIGNMENTS, TO MILLER TRACTION TREAD COMPANY, OF CHICAGO, ILLINOIS, A CORPORATION OF DELAWARE.

CONVERTER ATTACHMENT FOR DRIVE WHEELS OF AUTOMOTIVE VEHICLES.

Application filed December 18, 1920. Serial No. 431,741.

*To all whom it may concern:*

Be it known that I, ROYAL R. MILLER, a citizen of the United States, and a resident of the city of Chicago, in the county of Cook and State of Illinois, have invented certain new and useful Improvements in a Converter Attachment for Drive Wheels of Automotive Vehicles; and I do hereby declare that the following is a full, clear, and exact description of the same, reference being had to the accompanying drawings, and to the numerals of reference marked thereon, which form a part of this specification.

This invention relates to a converter attachment for drive-wheels of automotive vehicles and particularly to an attachment which is adapted to be quickly and conveniently applied to a track-laying tread type of drive wheel to convert the same into an ordinary type of round drive wheel. While the track-laying tread type drive wheel is more suitable for heavy hauling and work in soft ground, other conditions which are encountered by a tractor or similar automotive vehicle often make the use of a round wheel desirable. This is particularly true in cases where the vehicle is to be driven over paved highways, or used for light work where a high tractive efficiency is not needed, and where the noise of operation of the track-laying tread and the slower speed of the vehicle equipped with the same are objectionable.

It is an important object, therefore, of this invention to provide a converter attachment whereby a track-laying tread type of drive wheel may be quickly and conveniently converted into a round drive wheel of ordinary type.

It is a further object of this invention to provide a device which is adapted to be removably secured to a drive wheel of the gear-driven track-laying tread type to convert the same into a round drive wheel of ordinary type.

It is finally an important object of this invention to provide a drive wheel assembly adapted to be quickly changed to either a track-laying tread or an ordinary type of round drive wheel.

Other and further important objects of this invention will be apparent from the disclosures in the specification and the accompanying drawings.

The invention (in a preferred form) is shown on the drawings and hereinafter more fully described.

On the drawings:

Figure 1 is an elevation of a track-laying tread type of drive wheel adapted to be used with the converter attachment of this invention.

Figure 2 is a view in elevation showing the converter attachment secured on the drive wheel.

Figure 3 is an enlarged fragmentary detail elevation showing one of the attaching means for the converter attachment.

Figure 4 is an enlarged section on the line 4—4 of Figure 3.

Figure 5 is a section on the line 5—5 of Figure 1.

Figure 6 is a fragmentary detail of one of the detachable traction lugs.

Figure 7 is a side elevation of one of the track-laying tread elements.

Figure 8 is a top plan view of the same.

As shown on the drawings:

The driving element for the tractor drive wheel comprises a plate 1, in which a hub 2 is centrally formed, and on the periphery of said plate 1 are flanges 3 and 4 which extend outwardly therefrom in opposite directions. Formed on the inside of the flange 3 is an internal driving gear 5, which is adapted to be engaged by a suitable driving pinion operatively connected with the source of power of the automotive vehicle on which the drive wheel is mounted. A plurality of integral ribs 6 extend from the plate 1 to the flange 4 and afford a strong reinforced construction for the driving means. Integrally formed on the outside of the flange 4 are a plurality of gear teeth 7, which act to engage the track-laying tread mechanism to drive the same and which are tapered inwardly at their outer ends to afford easy engagement with said track-laying tread mechanism. The tread elements of said track-laying tread mechanism comprise flat plates 8 on which integral spaced brackets 9 are formed, as clearly shown in Figures 7 and 8. Each of said brackets 9 is provided at one end with an extension 10, in which a longitudinal slot 11 is formed and around the edges of the outside of each of said slots an integral facing 12 is formed on the extension 10. The opposite end of the bracket 9 is provided with an extension 13 which is provided with a longitudinal slot 11ᵃ similar to the slot 11 which has a facing 14 on the inside of said slot 13 similar to the facing 12 just described. Said extensions 13 are spaced a sufficient distance apart so that they will engage outside the members 12 on an adjacent tread member and said tread members are fastened together with a lost motion connection by inserting a pin 15 through the slots 11 and 11ᵃ therein and securing said pin in position by means of lock washers 16 and a cotter pin 17. The upper sides of each of said brackets 9 are provided with reinforcing flanges 18 which extend outwardly to connect with the extension 13, as clearly shown in Figures 7 and 8, and integrally formed beneath said flanges 18 near the central portion of each of said brackets 9 is a boss 19 which is provided with an aperture in which a pin 20 is adapted to be removably secured to afford means to be engaged by the gear teeth 7 on the flange 4. The inner faces of said brackets 9 are tapered inwardly toward the plates 8 in such a manner that a strengthened construction is afforded, and so that there is less likelihood of mud or other foreign matter preventing the engagement of the tapered gear teeth 7 therebetween. The tread elements which have just been described are connected together in pivotal relation by means of the pins 17 which are movable relative to the tread elements and allow movements of the tread elements relative to each other, and as said tread elements are engaged over the gear teeth 7, the rotation of the plate 1 causes the engagement of said gear teeth with the pins 15 and 20 and causes the tread elements to be moved successively forward into flat contacting relation with the surface over which the vehicle is traveling.

The use of these tread elements of the track-laying tread mechanism just described affords a high tractive efficiency to the drive wheel, but since this is not always necessary and since the noise and reduced speed of operation of the drive wheel occasioned by the use of said track-laying tread mechanism is often objectionable, it is desirable that means be provided whereby the track-laying tread elements may be removed and the device converted into a round drive wheel of the ordinary type.

The arrangement for accomplishing this purpose which is embodied in this invention is clearly shown in Figures 2 and 4. When it is desired to use the ordinary type of round drive wheel, the track-laying tread element is removed by taking out one of the pins 15 and lifting the tread elements away from the gear teeth 7. Said converter attachment comprises an annular rim 21 and to the inside of said rim a plurality of ribbed brackets 22 are secured by riveting or other suitable means. Said brackets 22 are so spaced that when the rim 21 is engaged over the gear teeth 7 the central portions of said bracket will be positioned opposite a space between two adjacent gear teeth 7. Said brackets 22 are provided at their inner ends with inwardly flanged openings 23 and extensions 24 and 25 of said bracket extend along the sides of said openings toward the gear teeth, their inner ends contacting the flange 4 outside the gear teeth 7, as clearly shown in Figure 4. Formed on the outer face of each of said extensions 24 and 25 is an integral projection 26 which tapers outwardly as shown in Figure 4. In order to clamp the rim firmly in position a pin 28 is engaged through the opening 23 resting on a flange 27 in the bottom thereof and is held in position thereon by inwardly bent extensions 27ᵃ of said flange. Secured to the outer end of said pin 27 is a ribbed block 29 which is adapted to engage the projecting ridge 26 on one of the members 24 or 25 when it is turned in the position shown in dotted lines in Figures 3 and 4. A similar block 30, which is somewhat shorter in length, is secured to the inner end of each of the pins 27, and said block 30 is provided with a V-shaped inner edge 31 which is adapted to engage the tapered rib 7ᵃ on the gear tooth 7 when the pin 28 is rotated to turn said block into the position shown in dotted lines in Figures 3 and 4. The forcing of said V-shaped edge 31 on the block 30 over the tapered rib on the tooth, of course, acts to secure the bracket 22 securely to the tooth and since the pin 28 is secured to the bracket 22 by the engagement of the block 29 with the projection 26, the rotation of said blocks 29 and 30 will act to lock the brackets 22 and the rim 21 thereon securely to the gear teeth 7 and the flange 4 and thus convert the device into a round drive wheel.

If desired, lugs 32 of a type similar to that shown in Figure 6 may be removably secured in the rim 21 to increase the traction thereof. Said lugs 32 ordinarily have a threaded portion 33 extending from the inner face thereof and said threaded portion is adapted to be engaged through an aperture in the rim 21 and have engaged thereon on the inside of said rim a bolt 34 and lock washer 35 whereby the lug is removably secured in position on said rim.

The operation is as follows:

As has been heretofore described, when it is desired to convert a track-laying type tread of drive wheel into a round drive wheel, the tread elements are removed from the gear teeth 7 by removing one of the pins 15 connecting an adjacent pair of tread elements and subsequently lifting said tread elements away from the gear teeth. The rim 21 is then engaged around the gear teeth, the brackets 22 secured thereto being positioned opposite the spaces between adjacent gear teeth 7 and the extensions 24 and 25 of said brackets engaging the flange 4 outside the gear teeth 7. The pins 28 are rotated by means of the ribs on the block 29 to the position shown in dotted lines in Figures 3 and 4 so that the V edges on the blocks 30 engage the tapered ribs 7ª on adjacent gear teeth 7, and so that the blocks 29 engage the tapered projections 26 on the members 25. By now striking the ribs on the blocks 29 a slight blow with a hammer or other tool, the V edges 31 are forced further over the tapered ribs 7ª and the brackets are locked firmly in position. When it is desired to reconvert the drive wheel into a track-laying tread type it is only necessary to reverse the above described operation and the blocks 29 and 30 may be conveniently disengaged by again striking the ribs on the blocks 29 a slight blow with a hammer or other suitable tool.

Thus it is apparent that this invention provides a convenient arrangement whereby a tractor or other automotive vehicle equipped with track-laying tread type drive wheels may be quickly and conveniently converted into a vehicle having the ordinary type or round drive wheels. Since this change may be effected without any change in the construction of the vehicle or the driving elements thereof, the construction afforded by this invention is a particularly desirable one.

I am aware that numerous details of construction may be varied through a wide range without departing from the principles of this invention, and I therefore do not purpose limiting the patent granted otherwise than necessitated by the prior art.

I claim as my invention:

1. In a drive wheel converter, the combination with a flanged annular plate, of gear teeth formed on the flange thereof, clamping means resting on the flange and frictionally engaging the gear teeth, and an annular rim supported by said clamping means and encircling said gear teeth.

2. In a drive wheel converter, the combination with a flanged annular plate, of gear teeth formed on the flange thereof, brackets resting on the flange and extending outwardly beyond the gear teeth, means for clamping said brackets to the gear teeth, and a rim supported by the brackets.

3. In a drive wheel converter, the combination with a flanged annular plate, of tapered gear teeth formed on the flange thereof, brackets resting on the flange extending beyond the gear teeth, means adapted to be driven over the tapered portions of the gear teeth to clamp said brackets thereto, and a rim supported by the brackets.

4. In a drive wheel converter, the combination with a flanged plate having driving gear teeth thereon, of brackets resting on the flange and extending beyond the gear teeth, and means rotatably mounted in the brackets and engaged between and over the gear teeth to removably secure said brackets thereto.

5. The combination with a wheel having peripheral teeth, of an integral tread element having inwardly extending brackets supported adjacent said teeth, and means extending from said brackets and engaging between said teeth for removably securing said tread element to said wheel.

6. The combination with a wheel having peripheral teeth with an annular flange upon the outer side of said teeth, of an integral rim having inwardly extending means resting upon said flange and securing devices extending between said teeth for the purpose described.

7. The combination with a wheel having peripheral teeth, of an integral rim surrounding said teeth and supporting means for said rim comprising spaced inwardly extending brackets removably clamped to said teeth.

In testimony whereof I have hereunto subscribing my name in the presence of two subscribing witnesses.

ROYAL R. MILLER.

Witnesses:
CARLTON HILL,
EARL M. HARDINE.